(12) United States Patent
Nakajima et al.

(10) Patent No.: US 11,204,191 B2
(45) Date of Patent: Dec. 21, 2021

(54) AIR-CONDITIONING APPARATUS PROVIDED WITH REFRIGERANT CIRCUIT CAPABLE OF PERFORMING HEATING OPERATION

(71) Applicant: Mitsubishi Electric Corporation, Tokyo (JP)

(72) Inventors: Komei Nakajima, Tokyo (JP); Yusuke Tashiro, Tokyo (JP); Akinori Sakabe, Tokyo (JP); Naoki Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 12 days.

(21) Appl. No.: 16/483,139

(22) PCT Filed: Apr. 18, 2017

(86) PCT No.: PCT/JP2017/015586
§ 371 (c)(1),
(2) Date: Aug. 2, 2019

(87) PCT Pub. No.: WO2018/193518
PCT Pub. Date: Oct. 25, 2018

(65) Prior Publication Data
US 2020/0284484 A1    Sep. 10, 2020

(51) Int. Cl.
*F25B 49/02* (2006.01)
*F25B 41/04* (2006.01)
(Continued)

(52) U.S. Cl.
CPC .............. *F25B 41/20* (2021.01); *F25B 6/02* (2013.01); *F25B 6/04* (2013.01); *F25B 49/027* (2013.01);
(Continued)

(58) Field of Classification Search
CPC ........ F25B 2313/023; F25B 2313/0233; F25B 2313/02334; F25B 2313/0234;
(Continued)

(56) References Cited

U.S. PATENT DOCUMENTS

| 2012/0023989 A1 | 2/2012 | Kinoshita et al. |
| 2014/0130534 A1* | 5/2014 | Scheumann ............... F25B 6/02 62/291 |
| 2015/0107286 A1 | 4/2015 | Jin et al. |

FOREIGN PATENT DOCUMENTS

| CN | 102356283 A | 2/2012 |
| CN | 102667276 A | 9/2012 |

(Continued)

OTHER PUBLICATIONS

Examination Results dated Apr. 20, 2020 issued in corresponding Russian patent application No. 2019125622 (and English translation).

(Continued)

*Primary Examiner* — Jonathan Bradford
(74) *Attorney, Agent, or Firm* — Posz Law Group, PLC

(57) ABSTRACT

An air-conditioning apparatus includes a first flow switching unit configured to be switched between a first state in which refrigerant communication between a compressor and a second load-side heat exchanger is blocked and a second state in which the compressor is in refrigerant communication with a first load-side heat exchanger and the second load-side heat exchanger. The air-conditioning apparatus further includes a second flow switching unit configured to be switched between a third state in which refrigerant communication between the second load-side heat exchanger and a heat-source-side heat exchanger is blocked and a fourth state in which the first load-side heat exchanger is in refrigerant communication with the second load-side heat exchanger and the heat-source-side heat exchanger. The first heat exchanger is located upstream of the second load-side heat exchanger. The second flow switching unit is located downstream of the second load-side heat exchanger.

4 Claims, 10 Drawing Sheets

(51) Int. Cl.
  *F25B 41/20* (2021.01)
  *F25B 6/02* (2006.01)
  *F25B 6/04* (2006.01)
  *F25B 41/39* (2021.01)

(52) U.S. Cl.
  CPC ..... *F25B 41/39* (2021.01); *F25B 2313/02334* (2013.01); *F25B 2313/02344* (2013.01); *F25B 2313/02531* (2013.01); *F25B 2313/02541* (2013.01); *F25B 2600/111* (2013.01); *F25B 2600/17* (2013.01); *F25B 2600/25* (2013.01); *F25B 2600/2503* (2013.01); *F25B 2600/2507* (2013.01); *F25B 2700/1931* (2013.01); *F25B 2700/2116* (2013.01)

(58) Field of Classification Search
  CPC ........ F25B 2313/02344; F25B 2313/25; F25B 2313/2503; F25B 2313/2507; F25B 2313/2515
  See application file for complete search history.

(56) References Cited

FOREIGN PATENT DOCUMENTS

| CN | 202869065 U | 4/2013 |
|---|---|---|
| CN | 103328895 A | 9/2013 |
| CN | 104566678 A | 4/2015 |
| DE | 100 19 302 A1 | 10/2001 |
| EP | 2 431 684 A1 | 3/2012 |
| EP | 2667108 A1 | 11/2013 |
| JP | S58-075638 A | 5/1983 |
| JP | S58-159448 U | 10/1983 |
| JP | S59-115944 A | 7/1984 |
| JP | H06-002969 A | 1/1994 |
| JP | H08-233345 A | 9/1996 |
| JP | 2000-118231 A | 4/2000 |
| JP | 2008-128628 A | 6/2008 |
| JP | 2010-261698 A | 11/2010 |
| JP | 2014-009859 A | 1/2014 |
| WO | 2015/063853 A1 | 5/2015 |

OTHER PUBLICATIONS

Extended European Search Report dated Apr. 24, 2020 issued in corresponding European patent application No. 17906045.4.
Office Action dated Apr. 28, 2020 issued in corresponding Japanese patent application No. 2019-513113 (and English translation).
International Search Report of the International Searching Authority dated Jul. 11, 2017 for the corresponding International application No. PCT/JP2017/015586 (and English translation).
Office Action dated Nov. 27, 2020 issued in corresponding CN patent application No. 201780088352.9 (and English machine translation).
Office Action dated Jul. 9, 2021 issued in corresponding CN patent application No. 201780088352.9 (and English machine translation).

* cited by examiner

AIR-CONDITIONING APPARATUS PROVIDED WITH REFRIGERANT CIRCUIT CAPABLE OF PERFORMING HEATING OPERATION

CROSS REFERENCE TO RELATED APPLICATION

This application is a U.S. national stage application of PCT/JP2017/015586 filed on Apr. 18, 2017, the contents of which are incorporated herein by reference.

TECHNICAL FIELD

The present invention relates to an air-conditioning apparatus provided with a refrigerant circuit capable of performing a heating operation.

BACKGROUND ART

Patent Literature 1 discloses a heat pump type air-conditioning apparatus. This heat pump type air-conditioning apparatus includes an indoor heat exchanger comprising a first heat exchanger and a second heat exchanger, a bypass circuit provided in parallel with the second heat exchanger, and a control valve provided on a refrigerant inlet side during heating of the second heat exchanger. The control valve operates so that refrigerant bypasses the second heat exchanger for a certain period of time from the start of heating. Patent Literature 1 discloses that according to this configuration, an increase in discharge pressure at the start of heating is advanced, thereby improving the start-up performance of the heating operation.

CITATION LIST

Patent Literature

Patent Literature 1: Japanese Unexamined Patent Application Publication No. S59-115944

SUMMARY OF INVENTION

Technical Problem

Typically, an indoor fan is stopped during the start-up time period of the heating operation to prevent cold air from being blown out to the indoor space. However, in the heat pump type air-conditioning apparatus disclosed in Patent Literature 1, when the indoor fan is stopped during the start-up time period of the heating operation, the liquid refrigerant stagnates in the second heat exchanger, in other words, dormant refrigerant is generated. This makes it difficult to increase the high-pressure-side pressure of the refrigerant circuit, resulting that a period of time from when the heating operation is started to when warm air is supplied to the indoor space is increased.

The present invention has been made to solve the above problem, and an object of the present invention is to provide an air-conditioning apparatus capable of reducing a period of time from when a heating operation is started to when warm air is supplied to an indoor space.

Solution to Problem

An air-conditioning apparatus of an embodiment of the present invention includes a refrigerant circuit including a compressor, a first load-side heat exchanger and a second load-side heat exchanger each of which functions as a condenser, and a heat-source-side heat exchanger functioning as an evaporator, the refrigerant circuit being configured to circulate refrigerant; a fan configured to supply air to at least one of the first load-side heat exchanger and the second load-side heat exchanger; a first flow switching unit located downstream of the compressor and upstream of the second load-side heat exchanger in a direction of flow of the refrigerant; and a second flow switching unit located downstream of the second load-side heat exchanger and upstream of the heat-source-side heat exchanger in the direction of flow of the refrigerant, wherein the first flow switching unit is configured to be switched between a first state in which refrigerant communication between the compressor and the second load-side heat exchanger is blocked and refrigerant communication is established between the compressor and the first load-side heat exchanger and a second state in which the compressor is in refrigerant communication with the first load-side heat exchanger and the second load-side heat exchanger, and the second flow switching unit is configured to be switched between a third state in which refrigerant communication between the second load-side heat exchanger and the heat-source-side heat exchanger is blocked and refrigerant communication is established between the first load-side heat exchanger and the heat-source-side heat exchanger and a fourth state in which the heat-source-side heat exchanger is in refrigerant communication with the first load-side heat exchanger and the second load-side heat exchanger.

Advantageous Effects of Invention

According to the present invention, when the first flow switching unit and the second flow switching unit are set in the first state and the third state, respectively, the second load-side heat exchanger is blocked on both sides of the upstream side and the downstream side from the flow path in which the refrigerant flows. With this operation, the heat transfer area of the load-side heat exchanger can be reduced, and dormant refrigerant can be prevented from being generated in the second load-side heat exchanger. Accordingly, since the condensing temperature and the high-pressure-side pressure of the refrigerant circuit can be increased further quickly, a period of time from when the heating operation is started to when warm air is supplied to the indoor space can be further reduced.

DESCRIPTION OF EMBODIMENTS

Embodiment 1

Figure 1:
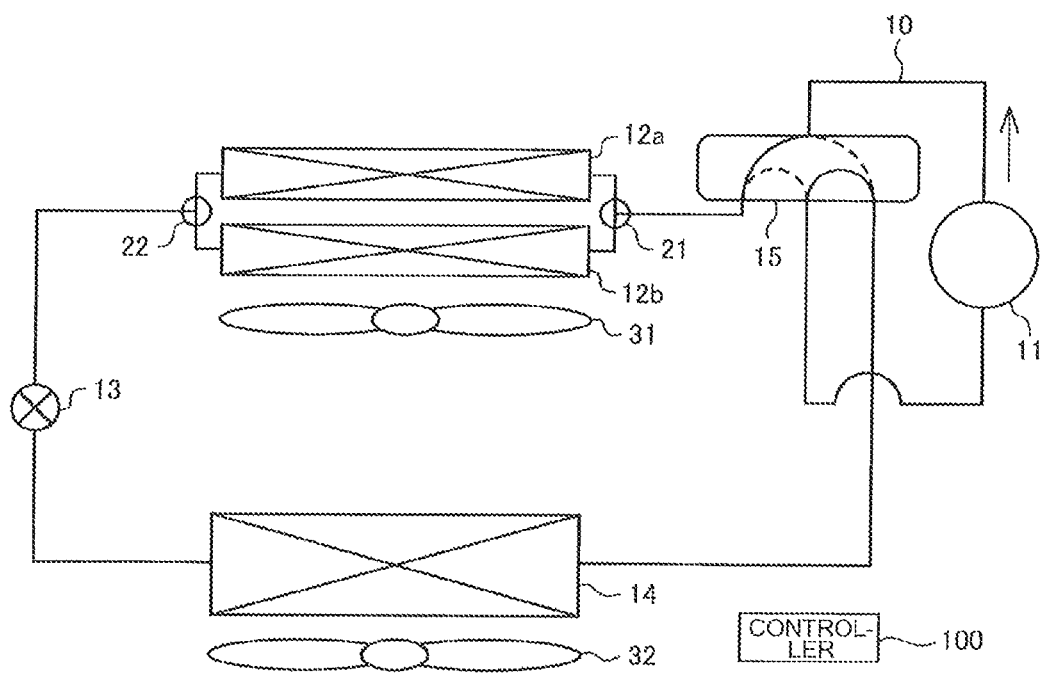
FIG. 1 is a refrigerant circuit diagram illustrating a schematic configuration of an air-conditioning apparatus according to Embodiment 1 of the present invention.

An air-conditioning apparatus according to Embodiment 1 of the present invention will be described. FIG. 1 is a refrigerant circuit diagram illustrating a schematic configuration of an air-conditioning apparatus according to the present embodiment. As illustrated in FIG. 1, the air-conditioning apparatus includes a refrigerant circuit 10 configured to circulate refrigerant. The refrigerant circuit 10 has a configuration in which a compressor 11, a four-way valve 15, a first load-side heat exchanger 12a, a second load-side heat exchanger 12b, a first pressure reducing device 13, and a heat-source-side heat exchanger 14 are sequentially connected in an annular fashion through refrigerant pipes. In the refrigerant circuit 10, the first load-side heat exchanger 12a and the second load-side heat exchanger 12b are connected in parallel with each other. The refrigerant circuit 10 is configured to switch a cooling operation and a heating operation. During the cooling operation, the first load-side heat exchanger 12a and the second load-side heat exchanger 12b function as an evaporator, and the heat-source-side heat exchanger 14 functions as a condenser. During the heating operation, the first load-side heat exchanger 12a and the second load-side heat exchanger 12b function as a condenser, and the heat-source-side heat exchanger 14 functions as an evaporator.

The air-conditioning apparatus includes an indoor fan 31 for supplying air to the first load-side heat exchanger 12a and the second load-side heat exchanger 12b, and an outdoor fan 32 for supplying air to the heat-source-side heat exchanger 14. The first load-side heat exchanger 12a and the second load-side heat exchanger 12b may be arranged in series in the direction of the flow of air supplied from the indoor fan 31, or may be arranged in parallel in the above-described air flow direction.

The compressor 11 is a fluid machine configured to suck and compress low-pressure gas refrigerant, and to discharge the compressed refrigerant as high-pressure gas refrigerant. As the compressor 11, an inverter-driven compressor capable of adjusting a driving rotation speed is used, for example. The four-way valve 15 is configured to switch a flow direction of the refrigerant in the refrigerant circuit 10 between the cooling operation and the heating operation. In the four-way valve 15 illustrated in FIG. 1, the solid lines indicate the flow paths during the heating operation, and the dotted lines indicate the flow paths during the cooling operation.

The heat-source-side heat exchanger 14 is a heat exchanger functioning as a condenser during the cooling operation, and functioning as an evaporator during the heating operation. In the heat-source-side heat exchanger 14, heat is exchanged between the refrigerant flowing inside thereof and outdoor air sent by the outdoor fan 32.

The first pressure reducing device 13 is configured to reduce the pressure of the refrigerant. As the first pressure reducing device 13, an electronic expansion valve capable of adjusting an opening degree by control of a controller 100 described later is used, for example.

Each of the first load-side heat exchanger 12a and the second load-side heat exchanger 12b functions as an evaporator during the cooling operation, and functions as a condenser during the heating operation. In each of the first load-side heat exchanger 12a and the second load-side heat exchanger 12b, heat is exchanged between the refrigerant flowing inside thereof and indoor air sent by the indoor fan 31. The first load-side heat exchanger 12a and the second load-side heat exchanger 12b have the same capacity, for example.

A three-way valve 21 (one example of a first flow switching unit) for switching a flow path in the refrigerant circuit 10 is provided at a branching portion located upstream of the first load-side heat exchanger 12a and the second load-side heat exchanger 12b that are connected in parallel with each other, relative to the flow of refrigerant during the heating operation. The three-way valve 21 is provided downstream of the compressor 11 and the four-way valve 15 in the direction of flow of the refrigerant during the heating operation. The three-way valve 21 is configured to be switched at least between a first state and a second state by control of a controller 100 described later. When the three-way valve 21 is set in the first state, refrigerant communication between the compressor 11 and the second load-side heat exchanger 12b is blocked, and refrigerant communication is established between the compressor 11 and the first load-side heat exchanger 12a. When the three-way valve 21 is set in the second state, the compressor 11 is in refrigerant communication with the first load-side heat exchanger 12a and the second load-side heat exchanger 12b. The three-way valve 21 illustrated in FIG. 1 is set in the second state. The three-way valve 21 may be further switched to a state other than the first state and the second state, such that refrigerant communication between the compressor 11 and the first load-side heat exchanger 12a is blocked and refrigerant communication is established between the compressor 11 and the second load-side heat exchanger 12b.

A three-way valve 22 (one example of a second flow switching unit) for switching a flow path in the refrigerant circuit 10 is provided at a branching portion located downstream of the first load-side heat exchanger 12a and the second load-side heat exchanger 12b that are connected in parallel with each other, in the direction of flow of the refrigerant during the heating operation. The three-way valve 22 is provided upstream of the heat-source-side heat exchanger 14 and the first pressure reducing device 13 in the direction of flow of the refrigerant during the heating operation. The three-way valve 22 is configured to be switched at least between a third state and a fourth state by control of a controller 100 described later. When the three-way valve 22 is set in the third state, refrigerant communication between the second load-side heat exchanger 12b and the heat-source-side heat exchanger 14 is blocked, and refrigerant communication is established between the first load-side heat exchanger 12a and the heat-source-side heat exchanger 14. When the three-way valve 22 is set in the fourth state, the heat-source-side heat exchanger 14 is in refrigerant communication with the first load-side heat exchanger 12a and the second load-side heat exchanger 12b. The three-way valve 22 illustrated in FIG. 1 is set in the fourth state. The three-way valve 22 may be further switched to a state other than the third state and the fourth state, such that refrigerant communication between the first load-side heat exchanger 12a and the heat-source-side heat exchanger 14 is blocked and refrigerant communication is established between the second load-side heat exchanger 12b and the heat-source-side heat exchanger 14.

An outdoor unit installed outdoors accommodates the compressor 11, the four-way valve 15, the first pressure reducing device 13, the heat-source-side heat exchanger 14, and the outdoor fan 32. An indoor unit installed indoors accommodates the first load-side heat exchanger 12a, the second load-side heat exchanger 12b, the three-way valves 21 and 22, and the indoor fan 31.

The controller 100 includes a microcomputer including a CPU, a ROM, a RAM, and an I/O port. The controller 100 is configured to control the operation of the entire air-conditioning apparatus including operations of the compressor 11, the four-way valve 15, the three-way valves 21 and 22, the first pressure reducing device 13, the indoor fan 31, and the outdoor fan 32 based on the detection signals received from various sensors provided in the refrigerant circuit 10 and the operation signal received from an operation unit. The controller 100 may be provided to an outdoor unit or may be provided to an indoor unit. The controller 100 may include an outdoor unit controller provided to the outdoor unit and an indoor unit controller provided to the indoor unit and capable of communicating with the outdoor unit controller.

Next, an operation of a refrigeration cycle of an air-conditioning apparatus will be described. First, the operation of the refrigeration cycle during the cooling operation will be described. During the cooling operation, the flow paths of the four-way valve 15 are switched as indicated by the dotted lines in FIG. 1 by control of the controller 100. Consequently, during the cooling operation, the refrigerant circuit 10 is configured such that the high-pressure refrigerant that has been discharged from the compressor 11 flows into the heat-source-side heat exchanger 14. During the cooling operation, the three-way valve 21 is set in the second state and the three-way valve 22 is set in the fourth state by control of the controller 100.

The high-temperature and high-pressure gas refrigerant that has been discharged from the compressor 11 flows into the heat-source-side heat exchanger 14 after passing through the four-way valve 15. During the cooling operation, the heat-source-side heat exchanger 14 functions as a condenser. More specifically, in the heat-source-side heat exchanger 14, heat is exchanged between the refrigerant flowing inside thereof and outdoor air sent by the outdoor fan 32, and heat of condensation of the refrigerant is transferred to the outdoor air. With this operation, the refrigerant that has flowed into the heat-source-side heat exchanger 14 is condensed to become high-pressure liquid refrigerant. The high-pressure liquid refrigerant that has flowed out of the heat-source-side heat exchanger 14 flows into the first pressure reducing device 13. The liquid refrigerant that has flowed into the first pressure reducing device 13 has the pressure reduced to become low-pressure two-phase refrigerant.

The low-pressure two-phase refrigerant reduced in pressure by the first pressure reducing device 13 diverges at the three-way valve 22, and flows into each of the first load-side heat exchanger 12a and the second load-side heat exchanger 12b. During the cooling operation, each of the first load-side heat exchanger 12a and the second load-side heat exchanger 12b functions as an evaporator. More specifically, in each of the first load-side heat exchanger 12a and the second load-side heat exchanger 12b, heat is exchanged between the refrigerant flowing inside thereof and indoor air sent by the indoor fan 31, and heat of evaporation of the refrigerant is received from the indoor air. With this operation, the two-phase refrigerant that has flowed into the first load-side heat exchanger 12a and the second load-side heat exchanger 12b evaporates to become low-pressure gas refrigerant. Furthermore, the indoor air sent by the indoor fan 31 is cooled by a heat receiving action of the refrigerant. The low-pressure gas refrigerant evaporated by each of the first load-side heat exchanger 12a and the second load-side heat exchanger 12b merges at the three-way valve 21, and is sucked by the compressor 11 after passing through the four-way valve 15. The low-pressure gas refrigerant sucked by the compressor 11 is compressed to become the high-temperature and high-pressure gas refrigerant. During the cooling operation, the above-described cycle is continuously repeated.

Next, the operation of the refrigeration cycle during the heating operation will be described. During the heating operation, the flow paths of the four-way valve 15 are switched as indicated by the solid lines in FIG. 1 by control of the controller 100. Consequently, during the cooling operation, the refrigerant circuit 10 is configured such that the high-pressure refrigerant that has been discharged from the compressor 11 flows into the first load-side heat exchanger 12a or the second load-side heat exchanger 12b. When the heating operation is started, the activation control is first performed by the controller 100. After the refrigeration cycle is stabilized, the normal control is performed instead of the activation control.

First, the operation of the refrigeration cycle after the refrigeration cycle is stabilized during the heating operation will be described. The high-temperature and high-pressure gas refrigerant that has been discharged from the compressor 11 passes through the four-way valve 15, diverges at the three-way valve 21, and flows into each of the first load-side heat exchanger 12a and the second load-side heat exchanger 12b. During the heating operation, each of the first load-side heat exchanger 12a and the second load-side heat exchanger 12b functions as a condenser. More specifically, in each of the first load-side heat exchanger 12a and the second load-side heat exchanger 12b, heat is exchanged between the refrigerant flowing inside thereof and indoor air sent by the indoor fan 31, and heat of condensation of the refrigerant is transferred to the indoor air. With this operation, the two-phase refrigerant that has flowed into the first load-side heat exchanger 12a and the second load-side heat exchanger 12b is condensed to become high-pressure liquid refrigerant. The indoor air sent by the indoor fan 31 is heat by a heat transferring action of the refrigerant.

The high-pressure liquid refrigerant condensed by each of the first load-side heat exchanger 12a and the second load-side heat exchanger 12b merges at the three-way valve 22, and flows into the first pressure reducing device 13. The liquid refrigerant that has flowed into the first pressure reducing device 13 has been pressure reduced to become low-pressure two-phase refrigerant. The low-pressure two-phase refrigerant reduced in pressure by the first pressure reducing device 13 flows into the heat-source-side heat exchanger 14. During the heating operation, the heat-source-side heat exchanger 14 functions as an evaporator. More specifically, in the heat-source-side heat exchanger 14, heat is exchanged between the refrigerant flowing inside thereof and outdoor air sent by the outdoor fan 32, and heat of evaporation of the refrigerant is received from the outdoor air. With this operation, the refrigerant that has flowed into the heat-source-side heat exchanger 14 evaporates to become low-pressure gas refrigerant. The low-pressure gas refrigerant that has flowed out of the heat-source-side heat exchanger 14 is sucked by the compressor 11 after passing through the four-way valve 15. The low-pressure gas refrigerant sucked by the compressor 11 is compressed to become the high-temperature and high-pressure gas refrigerant. During the heating operation, the above-described cycle is continuously repeated.

Figure 2:
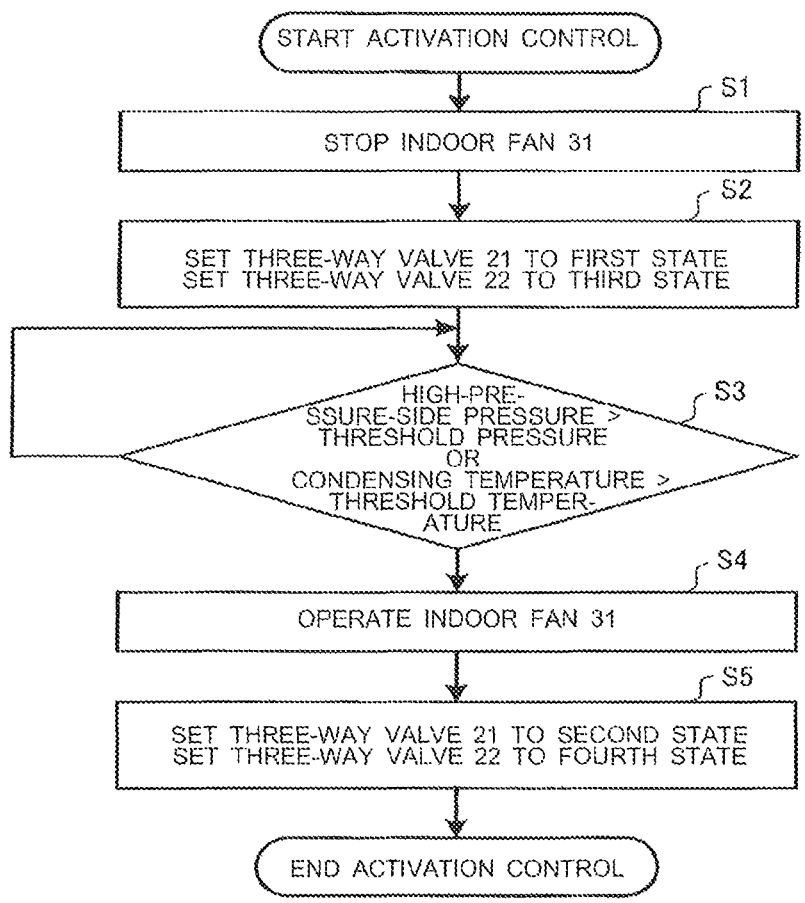
FIG. 2 is a flowchart illustrating an exemplary flow of an activation control performed by a controller 100 of the air-conditioning apparatus according to the Embodiment 1 of the present invention.

Next, the operation from when the heating operation is started to when the refrigeration cycle is stabilized will be described. FIG. 2 is a flowchart illustrating an exemplary flow of the activation control performed by the controller 100 of the air-conditioning apparatus according to the present embodiment. The activation control illustrated in FIG. 2 is performed when the state in which the air-conditioning apparatus is stopped is changed to the state in which the compressor 11 is activated to start the heating operation, in response to a command from the operation unit such as a remote control, for example. As illustrated in FIG. 2, when the activation control is started, the controller 100 stops the indoor fan 31 (step S1). More specifically, the controller 100 stops the indoor fan 31 when the indoor fan 31 is operated, and the controller 100 maintains the stopped state of the indoor fan 31 when the indoor fan 31 is stopped.

Next, the controller 100 sets the three-way valve 21 in the first state, and sets the three-way valve 22 in the second state (step S2).

Figure 3:
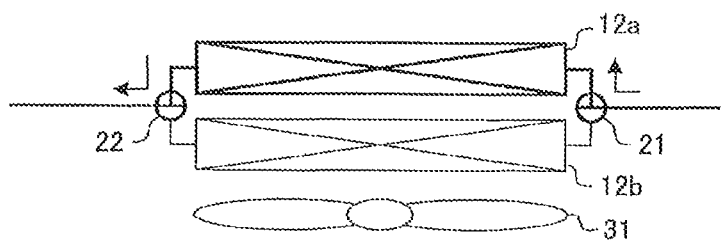
FIG. 3 is a diagram illustrating a refrigerant flow path from an upstream side to a downstream side of a first load-side heat exchanger 12a and a second load-side heat exchanger 12b when a three-way valve 21 and a three-way valve 22 are set in a first state and a third state, respectively, in the air-conditioning apparatus according to the Embodiment 1 of the present invention.

FIG. 3 is a diagram illustrating a refrigerant flow path from the upstream side to the downstream side of the first load-side heat exchanger 12a and the second load-side heat exchanger 12b when the three-way valve 21 and the three-way valve 22 are set in the first state and the third state, respectively, in the air-conditioning apparatus according to the present embodiment. In FIG. 3, the flow paths in which the refrigerant flows are indicated by thick lines, and the flow paths in which no refrigerant flows and the indoor fan 31 in the stopped state are indicated by thin lines. As illustrated in FIG. 3, when the three-way valve 21 is set in the first state and the three-way valve 22 is set in the third state, the refrigerant that has been discharged from the compressor 11 flows only into the first load-side heat exchanger 12a without flowing into the second load-side heat exchanger 12b. The second load-side heat exchanger 12b is separated from the flow path of the refrigerant by the three-way valve 21 provided upstream thereof and the three-way valve 22 provided downstream thereof.

Returning to FIG. 2, the controller 100 obtains a measurement of the high-pressure-side pressure of the refrigerant circuit 10 or a measurement of the condensing temperature of the refrigerant circuit 10. The measurement of the high-pressure-side pressure is obtained based on an output signal of a pressure sensor provided in a section on the high pressure side of the refrigerant circuit 10 (in other words, a section between the compressor 11 and the first pressure reducing device 13), for example. The measurement of the condensing temperature is obtained based on an output signal of a temperature sensor provided in a section from a two-phase portion of the first load-side heat exchanger 12a to the first pressure reducing device 13, for example.

The controller 100 determines whether the obtained measurement is higher than a predetermined threshold (step S3). More specifically, when obtaining the measurement of the high-pressure-side pressure, the controller 100 determines whether the measurement of the high-pressure-side pressure is higher than the predetermined threshold pressure. Alternatively, when obtaining the measurement of the condensing temperature is obtained, the controller 100 determines whether the measurement of the condensing temperature is higher than a predetermined threshold temperature. Accordingly, the controller 100 determines whether the refrigeration cycle in the refrigerant circuit 10 has been stabilized.

When determining that the obtained measurement is higher than the threshold, the controller 100 proceeds to the process of step S4. On the other hand, when determining that the obtained measurement is equal to or lower than the threshold, the controller 100 obtains a measurement of the high-pressure-side pressure or a measurement of the condensing temperature again, and executes the process of step S3 again.

In step S4, the controller 100 causes the indoor fan 31 to operate. Next, the controller 100 sets the three-way valve 21 in the second state, and sets the three-way valve 22 in the fourth state (step S5). Then, the controller 100 ends the activation control, and the activation control is shifted to the normal control.

Figure 4:
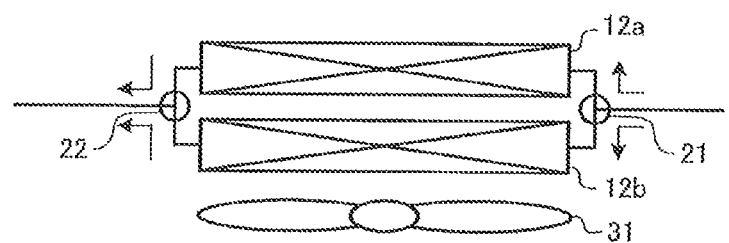
FIG. 4 is a diagram illustrating a refrigerant flow path from the upstream side to the downstream side of the first load-side heat exchanger 12a and the second load-side heat exchanger 12b when the three-way valve 21 and the three-way valve 22 are set in a second state and a fourth state, respectively, in the air-conditioning apparatus according to the Embodiment 1 of the present invention.

FIG. 4 is a diagram illustrating a refrigerant flow path from the upstream side to the downstream side of the first load-side heat exchanger 12a and the second load-side heat exchanger 12b when the three-way valve 21 and the three-way valve 22 are set in the second state and the fourth state, respectively, in the air-conditioning apparatus according to the present embodiment. In FIG. 4, the flow paths in which the refrigerant flows and the indoor fan 31 in the operating state are indicated by thick lines. As illustrated in FIG. 4, when the three-way valve 21 is set in the second state and the three-way valve 22 is set in the fourth state, the refrigerant that has been discharged from the compressor 11 flows into the first load-side heat exchanger 12a, the second load-side heat exchanger 12b in parallel.

Next, an effect according to the present embodiment will be described. During the heating operation, an amount of heat exchanged between the refrigerant and air in the indoor unit is denoted as Qc [kW], a circulation flow rate of the refrigerant in the refrigerant circuit 10 is denoted as Gr [kg/s], a specific enthalpy of the refrigerant on an inlet side of the indoor unit is denoted as hci [kJ/kg], a specific enthalpy of the refrigerant on an outlet side of the indoor unit is denoted as hco [kJ/kg], a surface area of the first load-side heat exchanger 12a (in other words, a heat transfer area between the refrigerant and the air) is denoted as Aoa [m$^2$], a surface area of the second load-side heat exchanger 12b is denoted as Aob [m$^2$], an overall heat transfer coefficient of each of the first load-side heat exchanger 12a and the second load-side heat exchanger 12b is denoted as K [kW/m$^2$·K)], a condensing temperature of the refrigerant is denoted as CT [degrees C.], and a suction temperature of the indoor air is denoted as Tair_in [degrees C.]. At this time, when the refrigerant flows only into the first load-side heat exchanger 12a as illustrated in FIG. 3, the characteristics when the refrigerant circuit 10 is stabilized are represented by the following equations (1) and (2).

$$Qc = Gr \times (hci - hco) \quad (1)$$

$$Qc = Aoa \times K \times (CT - Tair\_in) \quad (2)$$

On the other hand, when the refrigerant flows into both of the first load-side heat exchanger 12a and the second load-side heat exchanger 12b as illustrated in FIG. 4, the characteristics when the refrigerant circuit 10 is stabilized is represented by the following equations (3) and (4).

$$Qc = Gr \times (hci - hco) \quad (3)$$

$$Qc = (Aoa + Aob) \times K \times (CT - Tair\_in) \quad (4)$$

The circulation flow rate Gr is determined mainly by a rotation speed of the compressor 11. A specific enthalpy difference (hci−hco) is a substantially constant value without depending on the high-pressure-side pressure. Therefore, the amount of heat Qc represented by the equations (1) and (2) can be considered to be the same as the amount of heat Qc represented by the equations (3) and (4). Since the surface area Aoa in the equation (2) is smaller than the sum of the surface areas (Aoa+Aob) in the equation (4), the condensing temperature CT in the equation (2) is higher than the condensing temperature CT in the equation (4). More specifically, comparing the state illustrated in FIG. 3 with the state illustrated in FIG. 4, in the state illustrated in FIG. 3, the condensing temperature CT is stabilized at a high temperature, and therefore the high-pressure-side pressure is also stabilized at a high pressure. Accordingly, immediately after the compressor 11 is activated, the condensing temperature CT and the high-pressure-side pressure can reach the high value in the state illustrated in FIG. 3 more quickly than in the state illustrated in FIG. 4.

In the state illustrated in FIG. 3, since the indoor fan 31 is stopped, the value of the overall heat transfer coefficient K is reduced. Accordingly, the condensing temperature CT and the high-pressure-side pressure of the refrigerant circuit 10 can be increased in the state illustrated in FIG. 3 more quickly than in the state illustrated in FIG. 4.

Furthermore, in the state illustrated in FIG. 3, the second load-side heat exchanger 12b is blocked on both sides of the upstream side and the downstream side from the flow path in which the refrigerant flows. Therefore, dormant refrigerant can be prevented from being generated in the second load-side heat exchanger 12b. Accordingly, the condensing temperature CT and the high-pressure-side pressure of the refrigerant circuit 10 can be increased in the state illustrated in FIG. 3 more quickly than in the state illustrated in FIG. 4.

On the other hand, in the state illustrated in FIG. 4, in both of the first load-side heat exchanger 12a and the second load-side heat exchanger 12b, heat can be exchanged between the refrigerant and the indoor air. Accordingly, after the condensing temperature CT and the high-pressure-side pressure of the refrigerant circuit 10 are increased, the high heating capacity can be obtained.

Figure 5:
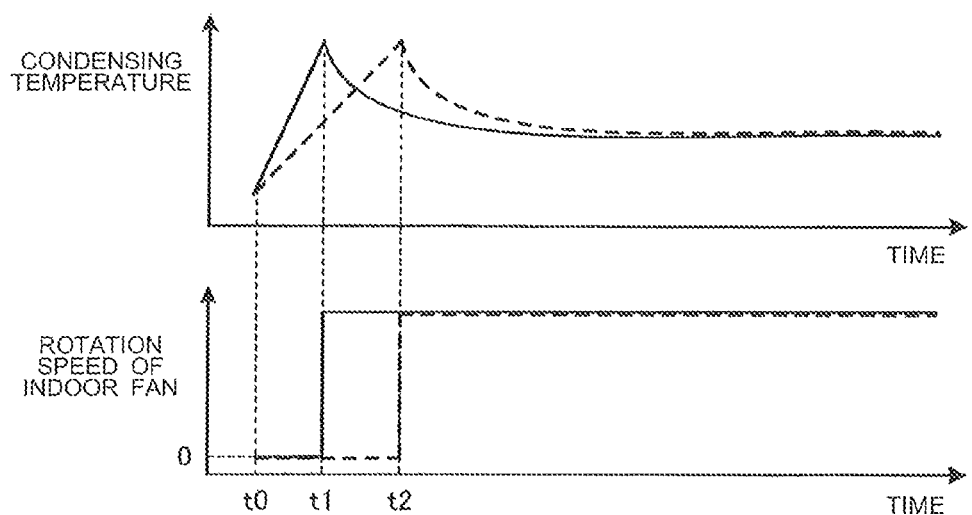
FIG. 5 is a timing chart showing an example of changes with time in the condensing temperature of the refrigerant circuit 10 and the rotation speed of the indoor fan 31 after the heating operation is started, in the air-conditioning apparatus according to the Embodiment 1 of the present invention.

FIG. 5 is a timing chart showing an example of changes with time in the condensing temperature of the refrigerant circuit 10 and the rotation speed of the indoor fan 31 after the heating operation is started, in the air-conditioning apparatus according to the present embodiment. In FIG. 5, the horizontal axis indicates time, the vertical axis of the upper timing chart indicates the condensing temperature of the refrigerant circuit 10, and the vertical axis of the lower timing chart indicates the rotation speed of the indoor fan 31. Even when the vertical axis of the upper timing chart in FIG. 5 indicates the high-pressure-side pressure of the refrigerant circuit 10 instead of the condensing temperature, the waveform of each graph is the same. The solid lines in FIG. 5 indicate changes with time in the condensing temperature and the rotation speed of the indoor fan 31 in the air-conditioning apparatus of the present embodiment, respectively. The dotted lines in FIG. 5 indicate changes with time in the condensing temperature and the rotation speed of the indoor fan 31 in an air-conditioning apparatus of a comparative example. Note that the air-conditioning apparatus of the comparative example has the same configuration as the air-conditioning apparatus of the present embodiment except that the three-way valves 21 and 22 are not provided.

As shown in FIG. 5, in the air-conditioning apparatus of the comparative example, when the heating operation is started at time t0, the operation of the indoor fan 31 is started at time t2 at which the condensing temperature and the high-pressure-side pressure are sufficiently increased. On the other hand, in the air-conditioning apparatus of the present embodiment, since the condensing temperature and the high-pressure-side pressure of the refrigerant circuit 10 can be increased more quickly than in the air-conditioning apparatus of the comparative example, the operation of the indoor fan 31 can be started at time t1 earlier than time t2 (t1−t0<t2−t0). Accordingly, according to the air-conditioning apparatus of the present embodiment, a period of time from when the heating operation is started to when warm air is supplied to the indoor space can be further reduced.

As described above, the air-conditioning apparatus according to the present embodiment includes the refrigerant circuit 10 including the compressor 11, the first load-side heat exchanger 12a and the second load-side heat exchanger 12b each of which functions as a condenser, and the heat-source-side heat exchanger 14 functioning as an evaporator, and configured to circulate the refrigerant, the indoor fan 31 (an example of the fan) configured to supply air to at least one of the first load-side heat exchanger 12a and the second load-side heat exchanger 12b, the three-way valve 21 (an example of the first flow switching unit) located downstream of the compressor 11 and upstream of the second load-side heat exchanger 12b in the direction of flow of the refrigerant, and the three-way valve 22 (an example of the second flow switching unit) located downstream of the second load-side heat exchanger 12b and upstream of the heat-source-side heat exchanger 14 in the direction of flow of the refrigerant. The three-way valve 21 is configured to be switched between the first state and the second state. In the first state, refrigerant communication between the compressor 11 and the second load-side heat exchanger 12b is blocked and refrigerant communication is established between the compressor 11 and the first load-side heat exchanger 12a. In the second state, the compressor 11 is in refrigerant communication with the first load-side heat exchanger 12a and the second load-side heat exchanger 12b. The three-way valve 22 is configured to be switched between the third state and the fourth state. In the third state, in refrigerant communication between the second load-side heat exchanger 12b and the heat-source-side heat exchanger 14 is blocked and refrigerant communication is established between the first load-side heat exchanger 12a and the heat-source-side heat exchanger 14. In the fourth state, the heat-source-side heat exchanger 14 is in refrigerant communication with the first load-side heat exchanger 12a and the second load-side heat exchanger 12b.

According to this configuration, when the three-way valve 21 and the three-way valve 22 are set in the first state and the third state, respectively, the second load-side heat exchanger 12b is blocked on both sides of the upstream side and the downstream side from the flow path in which the refrigerant flows. With this operation, the heat transfer area of the load-side heat exchanger can be reduced, and dormant refrigerant can be prevented from being generated in the second load-side heat exchanger 12b. Accordingly, since the condensing temperature CT and the high-pressure-side pressure of the refrigerant circuit 10 can be quickly increased, a period of time from when the heating operation is started to when warm air is supplied to the indoor space can be further reduced.

The air-conditioning apparatus according to the present embodiment further includes the controller 100 configured to control the three-way valves 21 and 22 and the indoor fan 31. The controller 100 is configured to: obtain the high-pressure-side pressure of the refrigerant circuit 10 or the condensing temperature of the refrigerant circuit 10 as a measurement; when the measurement is equal to or lower than the threshold, stop the indoor fan 31, set the three-way valve 21 in the first state, and set the three-way valve 22 in the third state; and when the measurement exceeds the threshold, cause the indoor fan 31 to operate, set the three-way valve 21 in the second state and set the three-way valve 22 in the fourth state.

According to this configuration, since the controller 100 determines the temperature of the first load-side heat exchanger 12a based on the obtained measurement, the operation of the indoor fan 31 can be started at the appropriate time. Accordingly, it is possible to supply the warm air to the indoor space at an early stage while preventing the cold air from being supplied to the indoor space. In addition, according to this configuration, after the high-pressure-side pressure or the condensing temperature of the refrigerant circuit 10 is increased, each of the first load-side heat exchanger 12a and the second load-side heat exchanger 12b exchanges heat between the refrigerant and the indoor air. Accordingly, the heating capacity of the air-conditioning apparatus can be increased.

In the air-conditioning apparatus according to the present embodiment, the first load-side heat exchanger 12a and the second load-side heat exchanger 12b may be connected in parallel with each other in the state in which the three-way valve 21 is set in the second state and the three-way valve 22 is set in the fourth state. Each of the first flow switching unit and the second flow switching unit may have a three-way valve.

Embodiment 2

Figure 6:
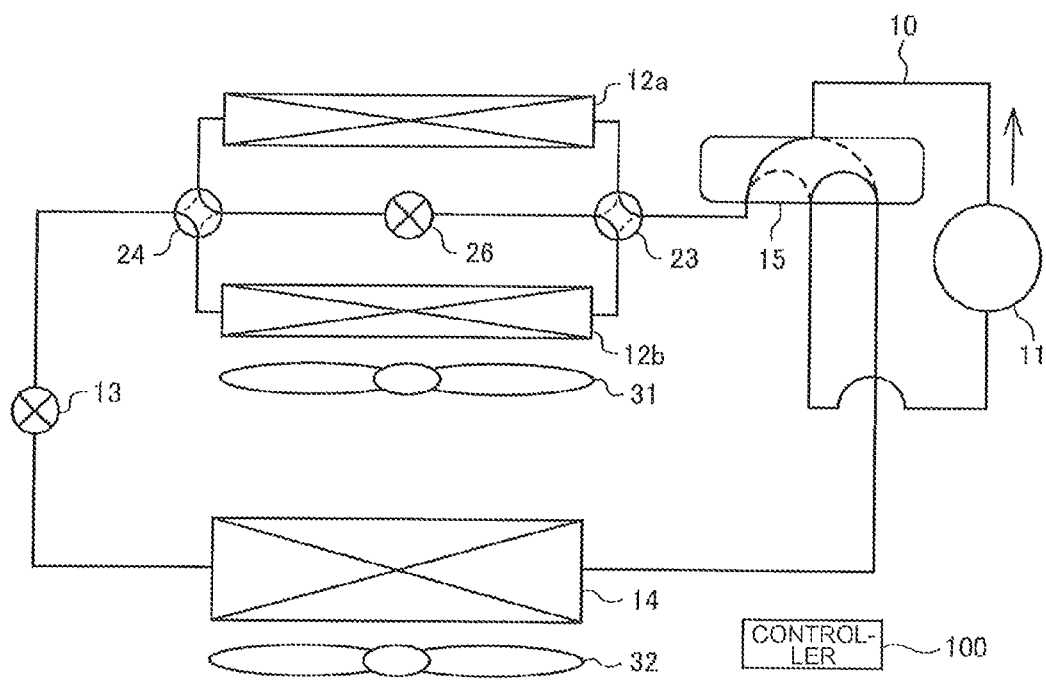
FIG. 6 is a refrigerant circuit diagram illustrating a schematic configuration of an air-conditioning apparatus according to Embodiment 2 of the present invention.

An air-conditioning apparatus according to Embodiment 2 of the present invention will be described. FIG. 6 is a refrigerant circuit diagram illustrating a schematic configuration of the air-conditioning apparatus according to the present embodiment. Note that components having the same functions and actions as those of Embodiment 1 are denoted by the same reference symbols, and the description thereof is herein omitted. As illustrated in FIG. 6, the first load-side heat exchanger 12a and the second load-side heat exchanger 12b of the present embodiment are connected in series in the direction of flow of the refrigerant in the refrigerant circuit 10. A second pressure reducing device 26 may be provided between the first load-side heat exchanger 12a and the second load-side heat exchanger 12b in the direction of flow of the refrigerant. As the second pressure reducing device 26, an electronic expansion valve capable of adjusting an opening degree by control of the controller 100 is used, for example.

A four-way valve 23 is provided in the refrigerant circuit 10, the four-way valve 23 being configured to switch which of the first load-side heat exchanger 12a and the second load-side heat exchanger 12b is located upstream. The four-way valve 23 is controlled by the controller 100. The four-way valve 23 illustrated in FIG. 6 is set to be located upstream of the first load-side heat exchanger 12*a* and the second load-side heat exchanger 12*b* in the direction of flow of the refrigerant during the heating operation.

In addition, the four-way valve 24 is provided in the refrigerant circuit 10 to connect refrigerant communication between the first load-side heat exchanger 12*a* and the second pressure reducing device 26 and refrigerant communication between the second load-side heat exchanger 12*b* and the first pressure reducing device 13. The four-way valve 24 functions as the first flow switching unit provided upstream of the second load-side heat exchanger 12*b*, and functions as the second flow switching unit provided downstream of the second load-side heat exchanger 12*b*. The four-way valve 24 is configured to be switched between the first state and the second state by control of a controller 100.

Figure 7:
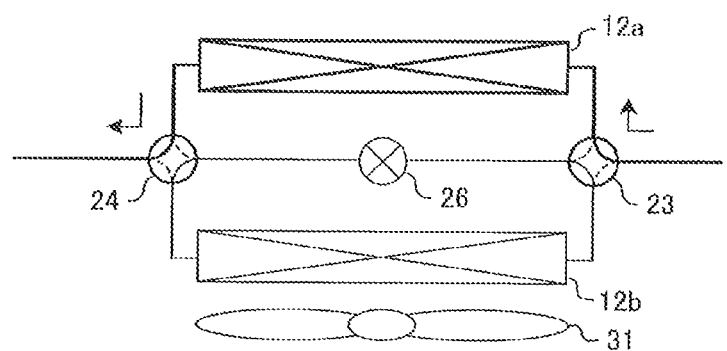
FIG. 7 is a diagram illustrating a refrigerant flow path from an upstream side to a downstream side of a first load-side heat exchanger 12a and a second load-side heat exchanger 12b when a four-way valve 24 is set in a first state, in the air-conditioning apparatus according to the Embodiment 2 of the present invention.

FIG. 7 is a diagram illustrating a refrigerant flow path from an upstream side to a downstream side of the first load-side heat exchanger 12*a* and the second load-side heat exchanger 12*b* when the four-way valve 24 is set in the first state, in the air-conditioning apparatus according to the present embodiment. The four-way valve 24 set in the first state is set in the first state as the first flow switching unit, and set in the third state as the second flow switching unit. More specifically, when the four-way valve 24 is set in the first state, refrigerant communication between the compressor 11 and the second load-side heat exchanger 12*b* is blocked and refrigerant communication is established between the compressor 11 and the first load-side heat exchanger 12*a*, as illustrated in FIG. 7. When the four-way valve 24 is set in the first state, refrigerant communication between the second load-side heat exchanger 12*b* and the heat-source-side heat exchanger 14 is blocked and refrigerant communication is established between the first load-side heat exchanger 12*a* and the heat-source-side heat exchanger 14. In this state, the refrigerant that has been discharged from the compressor 11 flows only into the first load-side heat exchanger 12*a*, but does not flow into the second load-side heat exchanger 12*b*. A short circuit flow path for short-circuiting without passing through the second load-side heat exchanger 12*b* is formed in the four-way valve 24. The second load-side heat exchanger 12*b* is separated from the flow path of the refrigerant by the one four-way valve 24 on both sides of the upstream side and the downstream side of the second load-side heat exchanger 12*b*.

Figure 8:
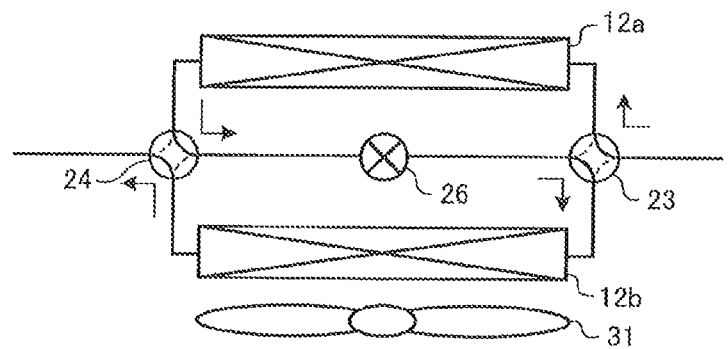
FIG. 8 is a diagram illustrating a refrigerant flow path from the upstream side to the downstream side of the first load-side heat exchanger 12a and the second load-side heat exchanger 12b when the four-way valve 24 is set in a second state, in the air-conditioning apparatus according to the Embodiment 2 of the present invention.

FIG. 8 is a diagram illustrating a refrigerant flow path from the upstream side to the downstream side of the first load-side heat exchanger 12*a* and the second load-side heat exchanger 12*b* when the four-way valve 24 is set in the second state, in the air-conditioning apparatus according to the present embodiment. The four-way valve 24 set in the second state is set in the second state as the first flow switching unit, and set in the fourth state as the second flow switching unit. More specifically, when the four-way valve 24 is set in the second state, the compressor 11 is in refrigerant communication with the first load-side heat exchanger 12*a* and the second load-side heat exchanger 12*b* and the heat-source-side heat exchanger 14 is in refrigerant communication with the first load-side heat exchanger 12*a* and the second load-side heat exchanger 12*b*, as illustrated in FIG. 8. In this state, the refrigerant that has been discharged from the compressor 11 flows into the first load-side heat exchanger 12*a* after passing through the four-way valve 15 and the four-way valve 23. The refrigerant that has flowed out of the first load-side heat exchanger 12*a* flows into the second load-side heat exchanger 12*b* after passing through the four-way valve 24, the second pressure reducing device 26, and the four-way valve 23. The refrigerant that has flowed out of the second load-side heat exchanger 12*b* flows into the heat-source-side heat exchanger 14 after passing through the four-way valve 24 and the first pressure reducing device 13. The refrigerant that has been discharged from the compressor 11 flows into both of the first load-side heat exchanger 12*a* and the second load-side heat exchanger 12*b* in series.

Figure 9:
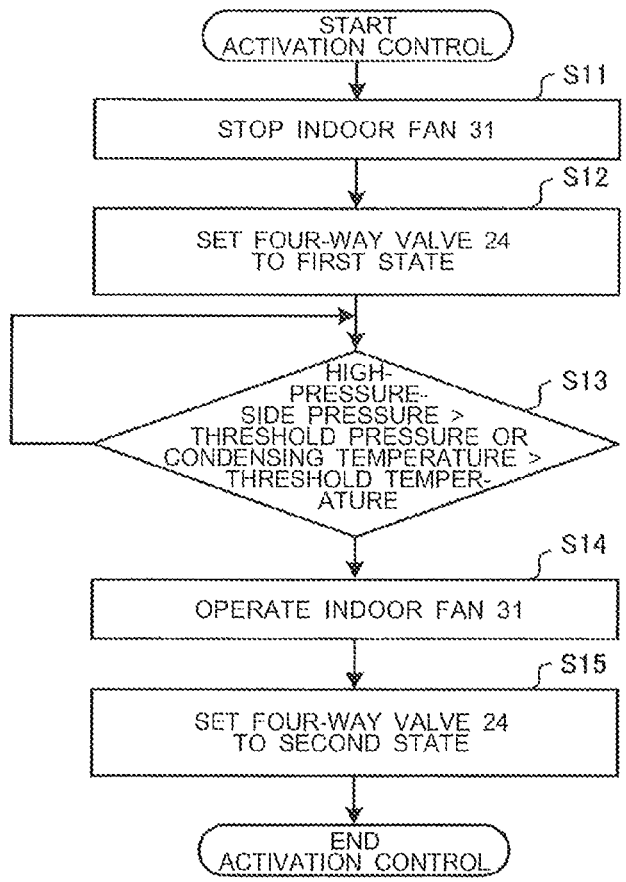
FIG. 9 is a flowchart illustrating an exemplary flow of an activation control performed by a controller 100 of the air-conditioning apparatus according to the Embodiment 2 of the present invention.

FIG. 9 is a flowchart illustrating an exemplary flow of an activation control performed by the controller 100 of the air-conditioning apparatus according to the present embodiment. The activation control illustrated in FIG. 9 is performed when the state in which the air-conditioning apparatus is stopped is changed to the state in which the compressor 11 is activated to start the heating operation, in response to a command from the operation unit such as a remote controller, for example. As illustrated in FIG. 9, when the activation control is started, the controller 100 stops the indoor fan 31 (step S11). More specifically, the controller 100 stops the indoor fan 31 when the indoor fan 31 is operated, and the controller 100 maintains the stopped state of the indoor fan 31 when the indoor fan 31 is stopped.

Next, the controller 100 sets the four-way valve 24 in the first state (step S12). With this operation, the four-way valve 24 is set in the first state as the first flow switching unit, and is set in the third state as the second flow switching unit.

Next, the controller 100 obtains a measurement of the high-pressure-side pressure of the refrigerant circuit 10 or a measurement of the condensing temperature of the refrigerant circuit 10. The measurement of the high-pressure-side pressure is obtained based on an output signal of a pressure sensor provided in a section on the high pressure side of the refrigerant circuit 10 (in other words, a section between the compressor 11 and the first pressure reducing device 13), for example. The measurement of the condensing temperature is obtained based on an output signal of a temperature sensor provided in a section from a two-phase portion of the first load-side heat exchanger 12*a* to the first pressure reducing device 13, for example.

The controller 100 determines whether the obtained measurement is higher than a predetermined threshold (step S13). More specifically, when obtaining the measurement of the high-pressure-side pressure, the controller 100 determines whether the measurement of the high-pressure-side pressure is higher than the predetermined threshold pressure. Alternatively, when obtaining the measurement of the condensing temperature, the controller 100 determines whether the measurement of the condensing temperature is higher than a predetermined threshold temperature. Accordingly, the controller 100 determines whether the refrigeration cycle in the refrigerant circuit 10 has been stabilized.

When determining that the obtained measurement is higher than the threshold, the controller 100 proceeds to the process of step S14. On the other hand, when determining that the obtained measurement is equal to or lower than the threshold, the controller 100 obtains a measurement of the high-pressure-side pressure or a measurement of the condensing temperature again, and executes the process of step S13 again.

In step S14, the controller 100 causes the indoor fan 31 to operate. Next, the controller 100 sets the four-way valve 24 in the second state (step S15). With this operation, the four-way valve 24 is set in the second state as the first flow switching unit, and is set in the fourth state as the second flow switching unit. Then, the controller 100 ends the activation control, and the activation control is shifted to the normal control.

According to the present embodiment, the same effects as those in Embodiment 1 can be obtained.

In the present embodiment, the second pressure reducing device 26 is provided between the first load-side heat exchanger 12a and the second load-side heat exchanger 12b that are connected in series. Therefore, when the four-way valve 24 is set in the second state, the condensing temperature in the first load-side heat exchanger 12a and the condensing temperature in the second load-side heat exchanger 12b can be differentiated from each other. For example, when the opening degree of the second pressure reducing device 26 is reduced, the condensing temperature in the second load-side heat exchanger 12b is lower than the condensing temperature of the first load-side heat exchanger 12a. As a result, the temperature of the blown air that has passed through the first load-side heat exchanger 12a and the temperature of the blown air that has passed through the second load-side heat exchanger 12b can be differentiated from each other. Furthermore, when the four-way valve 23 is switched, the condensing temperature in the second load-side heat exchanger 12b can be higher than the condensing temperature in the first load-side heat exchanger 12a.

As described above, in the air-conditioning apparatus according to the present embodiment, in the state in which the first flow switching unit is set in the second state and the second flow switching unit is set in the fourth state (for example, the state in which the four-way valve 24 is set in the first state), the first load-side heat exchanger 12a and the second load-side heat exchanger 12b may be connected in series in the direction of flow of the refrigerant.

In the air-conditioning apparatus according to the present embodiment, each of the first flow switching unit and the second flow switching unit may have one four-way valve 24.

Furthermore, the air-conditioning apparatus according to the present embodiment may further include the second pressure reducing device 26 (an example of the pressure reducing device) provided between the first load-side heat exchanger 12a and the second load-side heat exchanger 12b in the direction of flow of the refrigerant.

Embodiment 3

Figure 10:
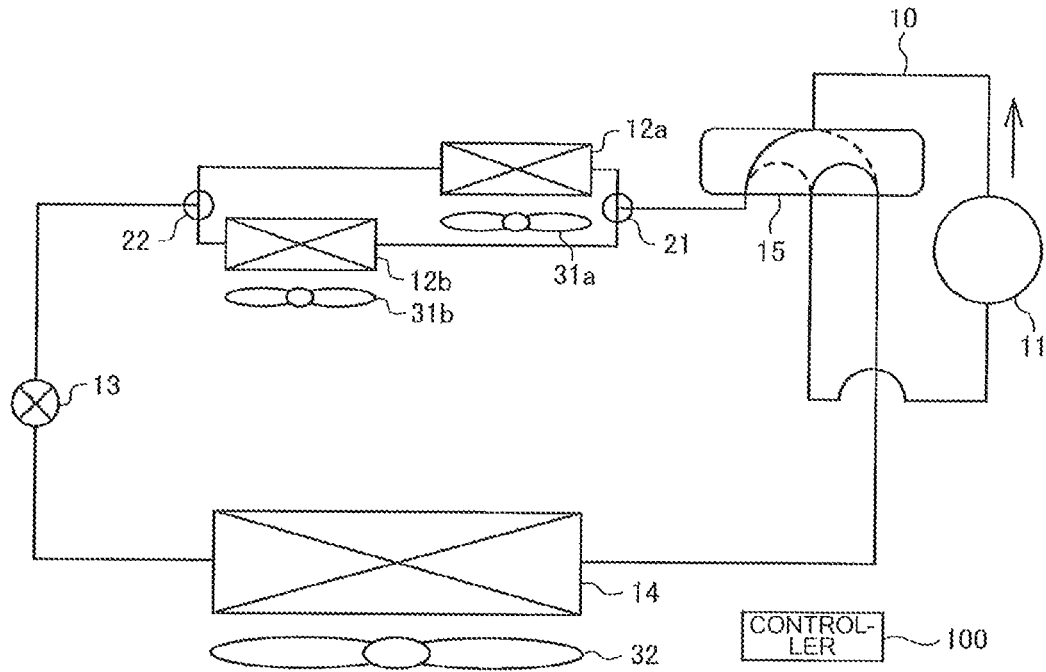
FIG. 10 is a refrigerant circuit diagram illustrating a schematic configuration of an air-conditioning apparatus according to Embodiment 3 of the present invention.

An air-conditioning apparatus according to Embodiment 3 of the present invention will be described. FIG. 10 is a refrigerant circuit diagram illustrating a schematic configuration of the air-conditioning apparatus according to the present embodiment. Note that components having the same functions and actions as those of Embodiment 1 are denoted by the same reference symbols, and the description thereof is herein omitted. As illustrated in FIG. 10, the air-conditioning apparatus of the present embodiment is different from that of Embodiment 1 in that a first indoor fan 31a for supplying air to the first load-side heat exchanger 12a and a second indoor fan 31b for supplying air to the second load-side heat exchanger 12b are individually provided.

The first load-side heat exchanger 12a, the second load-side heat exchanger 12b, the first indoor fan 31a, and the second indoor fan 31b are accommodated in one indoor unit, for example. For example, an air outlet elongated in the left-right direction is formed in the indoor unit. The air that has been sent by the first indoor fan 31a and has passed through the first load-side heat exchanger 12a is blown out of a portion on one side with respect to a center in the left-right direction of the air outlet. The air that has been sent by the second indoor fan 31b and has passed through the second load-side heat exchanger 12b is blown out of a portion on the other side with respect to the center in the left-right direction of the air outlet.

Figure 11:
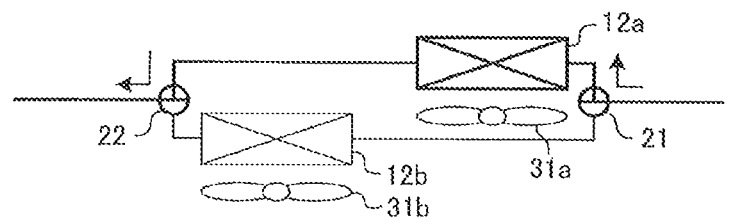
FIG. 11 is a diagram illustrating a refrigerant flow path from an upstream side to a downstream side of a first load-side heat exchanger 12a and a second load-side heat exchanger 12b when a three-way valve 21 and a three-way valve 22 are set in a first state and a third state, respectively, in the air-conditioning apparatus according to the Embodiment 3 of the present invention.

FIG. 11 is a diagram illustrating a refrigerant flow path from the upstream side to the downstream side of the first load-side heat exchanger 12a and the second load-side heat exchanger 12b when the three-way valve 21 and the three-way valve 22 are set in the first state and the third state, respectively, in the air-conditioning apparatus according to the present embodiment. As illustrated in FIG. 11, when the three-way valve 21 is set in the first state and the three-way valve 22 is set in the third state, the refrigerant that has been discharged from the compressor 11 flows only into the first load-side heat exchanger 12a without flowing into the second load-side heat exchanger 12b. The second load-side heat exchanger 12b is separated from the flow path of the refrigerant by the three-way valve 21 provided upstream thereof and the three-way valve 22 provided downstream thereof.

Figure 12:
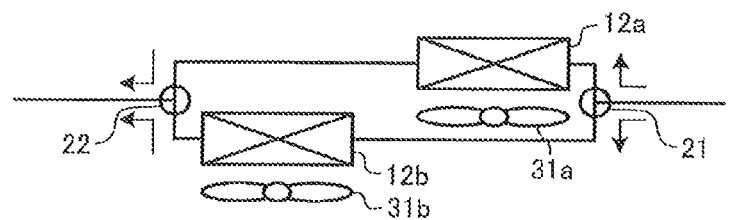
FIG. 12 is a diagram illustrating a refrigerant flow path from the upstream side to the downstream side of the first load-side heat exchanger 12a and the second load-side heat exchanger 12b when the three-way valve 21 and the three-way valve 22 are set in a second state and a fourth state, respectively, in the air-conditioning apparatus according to the Embodiment 3 of the present invention.

FIG. 12 is a diagram illustrating a refrigerant flow path from the upstream side to the downstream side of the first load-side heat exchanger 12a and the second load-side heat exchanger 12b when the three-way valve 21 and the three-way valve 22 are set in a second state and a fourth state, respectively, in the air-conditioning apparatus according to the present embodiment. As illustrated in FIG. 12, when the three-way valve 21 is set in the second state and the three-way valve 22 is set in the fourth state, the refrigerant that has been discharged from the compressor 11 flows into both of the first load-side heat exchanger 12a and the second load-side heat exchanger 12b in parallel.

The flow of the activation control in the present embodiment is the same as that in Embodiment 1.

Figure 13:
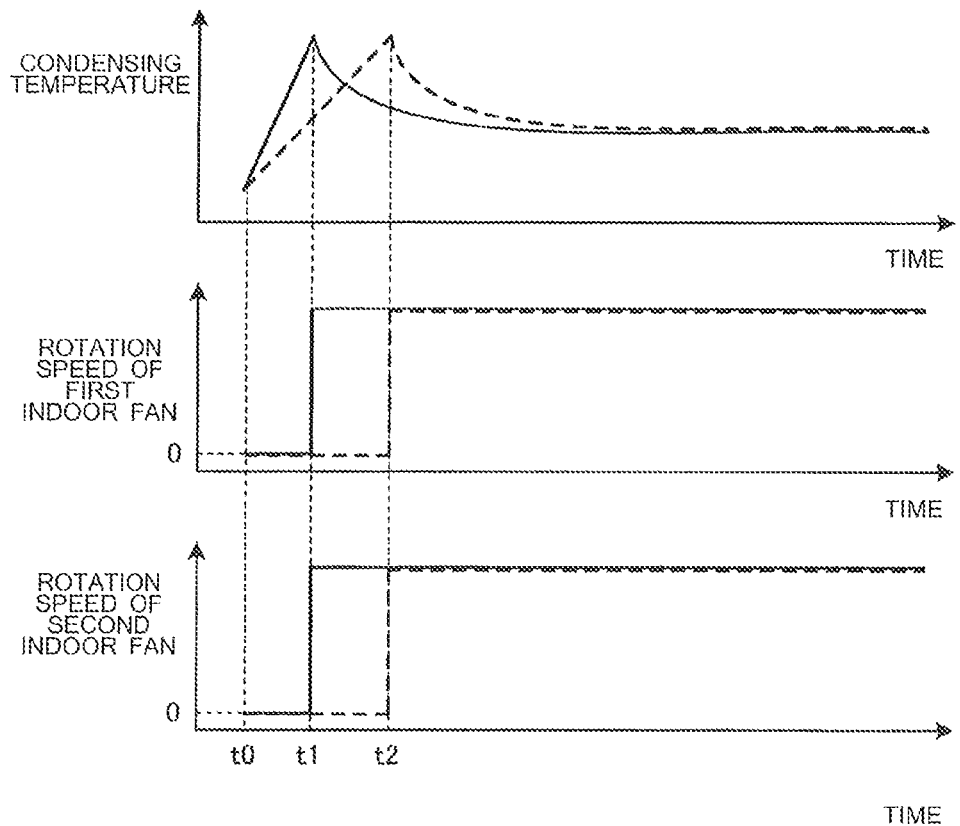
FIG. 13 is a timing chart showing an example of changes with time in the condensing temperature of the refrigerant circuit 10, the rotation speed of a first indoor fan 31a, and the rotation speed of an second indoor fan 31b after the heating operation is started, in the air-conditioning apparatus according to the Embodiment 3 of the present invention.

FIG. 13 is a timing chart showing an example of changes with time in the condensing temperature of the refrigerant circuit 10, the rotation speed of the first indoor fan 31a, and the rotation speed of the second indoor fan 31b after the heating operation is started, in the air-conditioning apparatus according to the present embodiment. In FIG. 13, the horizontal axis indicates time, the vertical axis of the upper timing chart indicates the condensing temperature of the refrigerant circuit 10, the vertical axis of the middle timing chart indicates the rotation speed of the first indoor fan 31a, and the vertical axis of the lower timing chart indicates the rotation speed of the second indoor fan 31b. The solid lines in FIG. 13 indicate changes with time in the condensing temperature and the rotation speeds of the first indoor fan 31a and the second indoor fan 31b in the air-conditioning apparatus of the present embodiment, respectively. The dotted lines in FIG. 13 indicate changes with time in the condensing temperature and the rotation speeds of the first indoor fan 31a and the second indoor fan 31b in the air-conditioning apparatus of the comparative example. Note that the air-conditioning apparatus of the comparative example has the same configuration as the air-conditioning apparatus of the present embodiment except that the three-way valves 21 and 22 are not provided.

As shown in FIG. 13, in the air-conditioning apparatus of the comparative example, when the heating operation is started at time t0, the operations of the first indoor fan 31a and the second indoor fan 31b are started at time t2 at which the condensing temperature and the high-pressure-side pressure are sufficiently increased. On the other hand, in the air-conditioning apparatus of the present embodiment, since the condensing temperature and the high-pressure-side pressure of the refrigerant circuit 10 can be increased more quickly than in the air-conditioning apparatus of the comparative example, the operations of the first indoor fan 31a and the second indoor fan 31b can be started at time t1 earlier than time t2. Accordingly, according to the air-conditioning apparatus of the present embodiment, a period of time from when the heating operation is started to when warm air is supplied to the indoor space can be further reduced.

In the present embodiment, the first indoor fan 31a for supplying air to the first load-side heat exchanger 12a and the second indoor fan 31b for supplying air to the second load-side heat exchanger 12b are individually provided. Therefore, an air volume passing through the first load-side heat exchanger 12a and an air volume passing through the second load-side heat exchanger 12b can be adjusted independently. Accordingly, the volume of the air blown out of the air outlet of the indoor unit can be adjusted more finely for each portion of the air outlet.

Embodiment 4

Figure 14:
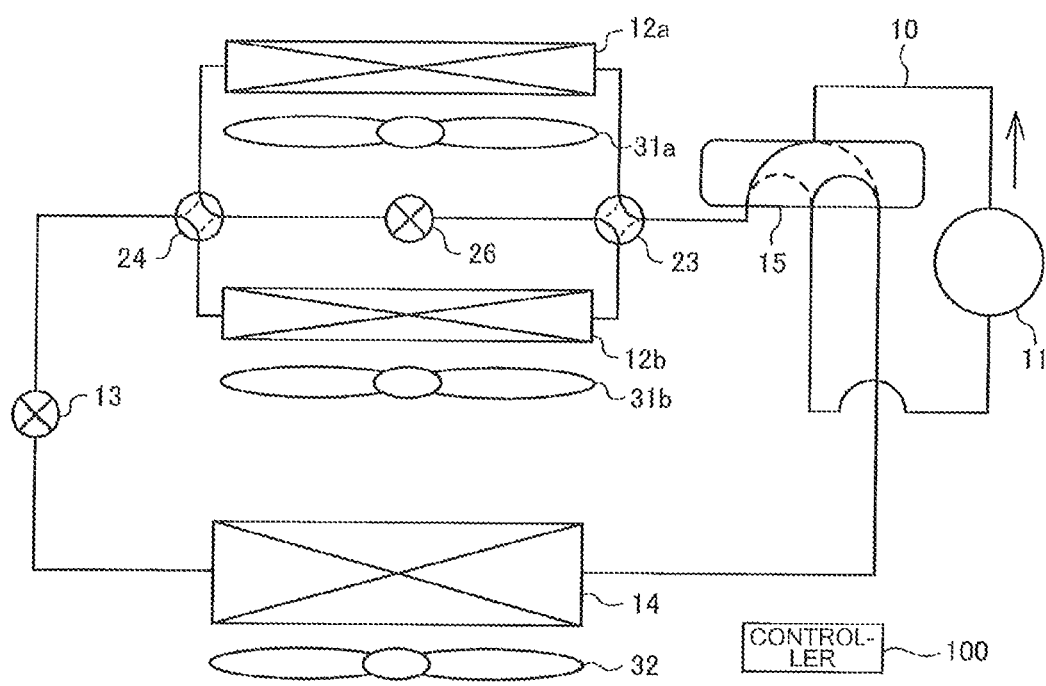
FIG. 14 is a refrigerant circuit diagram illustrating a schematic configuration of an air-conditioning apparatus according to Embodiment 4 of the present invention.

An air-conditioning apparatus according to Embodiment 4 of the present invention will be described. FIG. 14 is a refrigerant circuit diagram illustrating a schematic configuration of the air-conditioning apparatus according to the present embodiment. Note that components having the same functions and actions as those of Embodiment 1 or 2 are denoted by the same reference symbols, and the description thereof is herein omitted. As illustrated in FIG. 14, the air-conditioning apparatus of the present embodiment is different from that of Embodiment 2 in that a first indoor fan 31a for supplying air to the first load-side heat exchanger 12a and a second indoor fan 31b for supplying air to the second load-side heat exchanger 12b are individually provided.

The first load-side heat exchanger 12a, the second load-side heat exchanger 12b, the first indoor fan 31a, and the second indoor fan 31b are accommodated in one indoor unit, for example. For example, an air outlet elongated in the left-right direction is formed in the indoor unit. The air that has been sent by the first indoor fan 31a and had passed through the first load-side heat exchanger 12a is blown out of a portion on one side with respect to a center in the left-right direction of the air outlet. The air that has been sent by the second indoor fan 31b and has passed through the second load-side heat exchanger 12b is blown out of a portion on the other side with respect to the center in the left-right direction of the air outlet.

The flow of the activation control in the present embodiment is the same as that in Embodiment 2.

In the present embodiment, similarly to Embodiment 3, an air volume passing through the first load-side heat exchanger 12a and an air volume passing through the second load-side heat exchanger 12b can be adjusted independently. Furthermore, in the present embodiment, similarly to Embodiment 2, the condensing temperature in the first load-side heat exchanger 12a and the condensing temperature in the second load-side heat exchanger 12b can be differentiated from each other. Accordingly, the volume and temperature of the air blown out of the air outlet of the indoor unit can be adjusted more finely for each portion of the air outlet.

Embodiment 5

Figure 15:
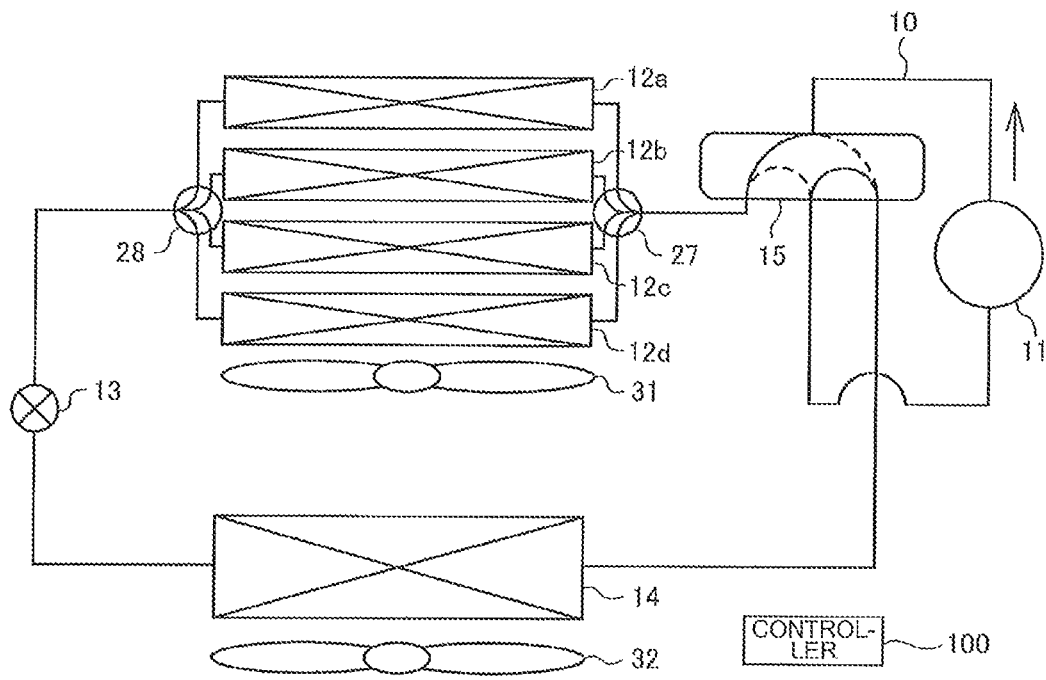
FIG. 15 is a refrigerant circuit diagram illustrating a schematic configuration of an air-conditioning apparatus according to Embodiment 5 of the present invention.

An air-conditioning apparatus according to Embodiment 5 of the present invention will be described. FIG. 15 is a refrigerant circuit diagram illustrating a schematic configuration of the air-conditioning apparatus according to the present embodiment. Note that components having the same functions and actions as those of Embodiment 1 are denoted by the same reference symbols, and the description thereof is herein omitted. As illustrated in FIG. 15, the air-conditioning apparatus of the present embodiment is different from that of Embodiment 1 in that four load-side heat exchangers are provided in parallel with one another. Note that the number of the load-side heat exchangers may be three or five or more as well. The first load-side heat exchanger 12a, the second load-side heat exchanger 12b, the third load-side heat exchanger 12c, and the fourth load-side heat exchanger 12d have the same capacity, and are accommodated in one indoor unit, for example. In the present embodiment, one indoor fan 31 is provided, but similarly to Embodiment 3 or 4, four indoor fans may be provided to supply air to the first load-side heat exchanger 12a, the second load-side heat exchanger 12b, the third load-side heat exchanger 12c, and the fourth load-side heat exchanger 12d, respectively.

A five-way valve 27 (one example of a first flow switching unit) is provided at a branching portion located upstream of the first load-side heat exchanger 12a, the second load-side heat exchanger 12b, the third load-side heat exchanger 12c, and the fourth load-side heat exchanger 12d relative to the flow of refrigerant during the heating operation. The five-way valve 27 is configured to be switched at least between a first state and a second state by control of a controller 100.

A five-way valve 28 (one example of a second flow switching unit) is provided at a branching portion located downstream of the first load-side heat exchanger 12a, the second load-side heat exchanger 12b, the third load-side heat exchanger 12c, and the fourth load-side heat exchanger 12d in the direction of flow of the refrigerant during the heating operation. The five-way valve 28 is configured to be switched at least between a third state and a fourth state by control of a controller 100 described later.

Figure 16:
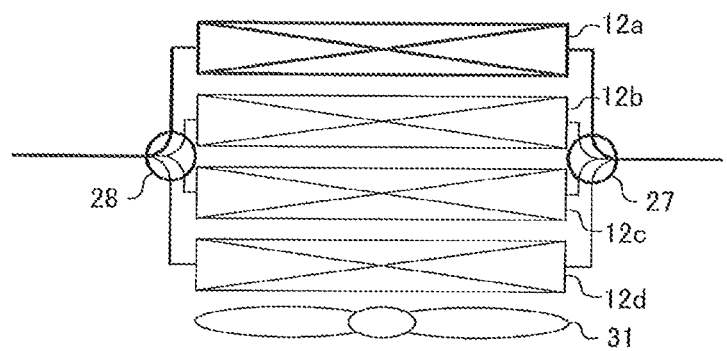
FIG. 16 is a diagram illustrating a refrigerant flow path from an upstream side to a downstream side of a first load-side heat exchanger 12a, a second load-side heat exchanger 12b, a third load-side heat exchanger 12c, and a fourth load-side heat exchanger 12d when a five-way valve 27 and a five-way valve 28 are set in a first state and a third state, respectively, in the air-conditioning apparatus according to the Embodiment 5 of the present invention.

FIG. 16 is a diagram illustrating a refrigerant flow path from the upstream side to the downstream side of the first load-side heat exchanger 12a, the second load-side heat exchanger 12b, the third load-side heat exchanger 12c, and the fourth load-side heat exchanger 12d when the five-way valve 27 and the five-way valve 28 are set in the first state and the third state, respectively, in the air-conditioning apparatus according to the present embodiment. As illustrated in FIG. 16, when the five-way valve 27 is set in the first state and the five-way valve 28 is set in the third state, the refrigerant that has been discharged from the compressor 11 flows only into the first load-side heat exchanger 12a without flowing into the second load-side heat exchanger 12b, the third load-side heat exchanger 12c, and the fourth load-side heat exchanger 12d. The second load-side heat exchanger 12b, the third load-side heat exchanger 12c, and the fourth load-side heat exchanger 12d are separated from the flow path of the refrigerant by the five-way valve 27 provided upstream thereof and the five-way valve 28 provided downstream thereof.

Figure 17:
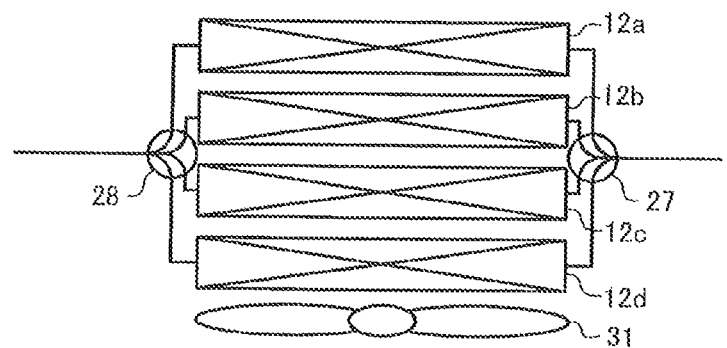
FIG. 17 is a diagram illustrating a refrigerant flow path from the upstream side to the downstream side of the first load-side heat exchanger 12a, the second load-side heat exchanger 12b, the third load-side heat exchanger 12c, and the fourth load-side heat exchanger 12d when the five-way valve 27 and the five-way valve 28 are set in a second state and a fourth state, respectively, in the air-conditioning apparatus according to the Embodiment 5 of the present invention.

FIG. 17 is a diagram illustrating a refrigerant flow path from the upstream side to the downstream side of the first load-side heat exchanger 12a, the second load-side heat exchanger 12b, the third load-side heat exchanger 12c, and the fourth load-side heat exchanger 12d when the five-way valve 27 and the five-way valve 28 are set in a second state and a fourth state, respectively, in the air-conditioning apparatus according to the present embodiment. As illustrated in FIG. 17, when the five-way valve 27 is set in the second state and the five-way valve 28 is set in the fourth state, the refrigerant that has been discharged from the compressor 11 flows into all of the first load-side heat exchanger 12a, the second load-side heat exchanger 12b, the third load-side heat exchanger 12c, and the fourth load-side heat exchanger 12d in parallel.

The flow of the activation control in the present embodiment is the same as that in Embodiment 1.

Figure 18:
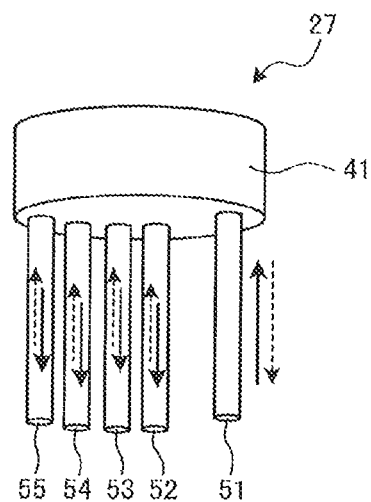
FIG. 18 is a schematic diagram illustrating an example of a configuration of the five-way valve 27 of the air-conditioning apparatus according to the Embodiment 5 of the present invention.
Figure 19:
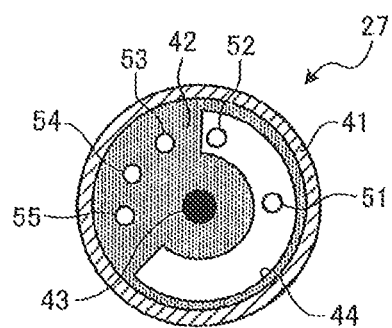
FIG. 19 is a diagram illustrating a sectional configuration when the five-way valve 27 illustrated in FIG. 18 is set in the first state.
Figure 20:
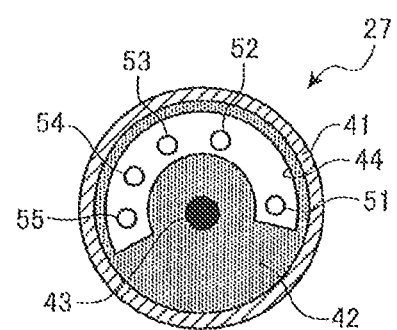
FIG. 20 is a diagram illustrating a sectional configuration when the five-way valve 27 illustrated in FIG. 18 is set in the second state.

FIG. 18 is a schematic diagram illustrating an example of a configuration of the five-way valve 27 of the air-conditioning apparatus according to the Embodiment 5 of the present invention. In FIG. 18, solid arrows each indicate a flow direction of the refrigerant during the heating operation, and dotted arrows each indicate a flow direction of the refrigerant during the cooling operation. FIG. 19 is a diagram illustrating a sectional configuration when the five-way valve 27 illustrated in FIG. 18 is set in the first state. FIG. 20 is a diagram illustrating a sectional configuration when the five-way valve 27 illustrated in FIG. 18 is set in the second state. Hereinafter, the five-way valve 27 will be described, and the five-way valve 28 has the same configuration as the five-way valve 27.

As illustrated in FIG. 18 to FIG. 20, the five-way valve 27 has a rotary valve structure. The five-way valve 27 includes a casing 41 formed in a bottomed cylindrical shape, and a columnar valve body 42 accommodated in the casing 41 to be concentric with the casing 41. The valve body 42 is configured to rotate around a rotation shaft 43 provided on a center axis of the casing 41 within a predetermined angle range with respect to the casing 41, by control of the controller 100.

A first port 51, a second port 52, a third port 53, a fourth port 54, and a fifth port 55 are formed in the circular bottom of the casing 41, to be arranged at a predetermined intervals in the circumferential direction around the rotation shaft 43. The first port 51 serves as an inlet of the refrigerant during the heating operation, and as an outlet of the refrigerant during the cooling operation. The second port 52 to the fifth port 55 each serve as an outlet of the refrigerant during the heating operation, and as an inlet of the refrigerant during the cooling operation. The first port 51 is connected to the four-way valve 15 through a refrigerant pipe. The second port 52 to the fifth port 55 are connected to the first load-side heat exchanger 12a to the fourth load-side heat exchanger 12d through refrigerant pipes, respectively.

A sector-shaped or circular-arc-shaped communicating groove 44 is formed around the rotation shaft 43 in the valve body 42, to face the first port 51 to the fifth port 55.

When the five-way valve 27 is set in the first state, the first port 51 and the second port 52 communicate with each other through the communicating groove 44, as illustrated in FIG. 19. The second port 52 to the fifth port 55 are closed by the valve body 42. In contrast, when the five-way valve 27 is set in the second state, the first port 51 communicate with each of the second port 52 to the fifth port 55 through the communicating groove 44, as illustrated in FIG. 20.

As described above, each of the first flow switching unit and the second flow switching unit may have a rotary valve.

In the present embodiment, the heat transfer area of the load-side heat exchanger when the five-way valve 27 and the five-way valve 28 are set in the first state and the third state, respectively, is reduced to about a quarter of the heat transfer area of the load-side heat exchanger when the five-way valve 27 and the five-way valve 28 are set in the second state and the fourth state, respectively. Therefore, the condensing temperature and the high-pressure-side pressure of the refrigerant circuit 10 can be increased more quickly than in Embodiments 1 to 4. Accordingly, a period of time from when the heating operation is started to when warm air is supplied to the indoor space can be reduced more than in Embodiments 1 to 4.

The present invention is not limited to the above-described embodiments, but may be modified in various manners.

For example, although the three-way valve, the four-way valve, the five-way valve and other valves are exemplified as the first flow switching unit and the second flow switching unit in the above-described embodiments, each of the first flow switching unit and the second flow switching unit may be comprised of one or a plurality of two-way valves.

REFERENCE SIGNS LIST

10 Refrigerant circuit, 11 Compressor, 12a First load-side heat exchanger, 12b Second load-side heat exchanger, 12c Third load-side heat exchanger, 12d Fourth load-side heat exchanger, 13 First pressure reducing device, 14 Heat-source-side heat exchanger, 15 Four-way valve, 21, 23 Three-way valve, 23, 24 Four-way valve, 26 Second pressure reducing device, 27, 28

Five-way valve, 31 Indoor fan, 31a First indoor fan, 31b Second indoor fan, 32 Outdoor fan, 41 Casing, 42 Valve body, 43 Rotation shaft, 44

Communicating groove, 51 First port, 52 Second port, 53 Third port, 54

Fourth port, 55 Fifth port, 100 Controller

The invention claimed is:

1. An air-conditioning apparatus, comprising:
a refrigerant circuit including a compressor, a first load-side heat exchanger and at least one second load-side heat exchanger each of which functions as a condenser, and a heat-source-side heat exchanger functioning as an evaporator, the refrigerant circuit being configured to circulate refrigerant;
a fan configured to supply air to the first load-side heat exchanger and the at least one second load-side heat exchanger;
a first flow switching unit located downstream of the compressor and upstream of the at least one second load-side heat exchanger in a direction of flow of the refrigerant;
a second flow switching unit located downstream of the at least one second load-side heat exchanger and upstream of the heat-source-side heat exchanger in the direction of flow of the refrigerant; and
a controller configured to:
switch the first flow switching unit between a first state in which refrigerant communication between the compressor and the at least one second load-side heat exchanger is blocked and refrigerant communication is established between the compressor and the first load-side heat exchanger and a second state in which the compressor is in refrigerant communication with the first load-side heat exchanger and the at least one second load-side heat exchanger, and
switch the second flow switching unit between a third state in which, when the first flow switching unit is set in the first state, refrigerant communication between the at least one second load-side heat exchanger and the heat-source-side heat exchanger is blocked and refrigerant communication is established between the first load-side heat exchanger and the heat-source-side heat exchanger, and a fourth state in which the heat-source-side heat exchanger is in refrigerant communication with the first load-side heat exchanger and the at least one second load-side heat exchanger, wherein the first load-side heat exchanger and the at least one second load-side heat exchanger are connected in series in the direction of flow of the refrigerant in a state in which the first flow switching unit is set in the second state and the second flow switching unit is set in the fourth state.

2. The air-conditioning apparatus of claim 1, wherein the controller is configured to control the first flow switching unit, the second flow switching unit, and the fan, wherein the controller is configured to:

obtain a measurement of a high-pressure-side pressure of the refrigerant circuit or a measurement of a condensing temperature of the refrigerant circuit, when the measurement is equal to or lower than a threshold, stop the fan, set the first flow switching unit in the first state, and set the second flow switching unit in the third state, and when the measurement exceeds the threshold, cause the fan to operate, and set the first flow switching unit in the second state and set the second flow switching unit in the fourth state.

3. The air-conditioning apparatus of claim 1, wherein each of the first flow switching unit and the second flow switching unit has one four-way valve.

4. The air-conditioning apparatus of claim 1, further comprising:

a pressure reducing device provided between the first load-side heat exchanger and the at least one second load-side heat exchanger in the direction of flow of the refrigerant.

* * * * *